United States Patent [19]

Petroff et al.

[11] Patent Number: 5,527,855
[45] Date of Patent: Jun. 18, 1996

[54] PRODUCTION OF ORGANOPOLYSILOXANE COPOLYMERS WITH A PHENYL ETHER SOLVENT

[75] Inventors: Lenin J. Petroff, Bay City; Michael A. Stanga, Midland; Joseph S. Steger, Freeland, all of Mich.; James D. Thornsberry, Meridian, Miss.

[73] Assignee: Dow Corning Corporation, Midland, Mich.

[21] Appl. No.: 427,297

[22] Filed: Apr. 21, 1995

Related U.S. Application Data

[63] Continuation-in-part of Ser. No. 172,628, Dec. 23, 1993, Pat. No. 5,430,097.

[51] Int. Cl.$^6$ ........................................... C08K 5/06
[52] U.S. Cl. .................. 524/755; 524/375; 524/588; 524/862; 556/445; 528/15; 528/31; 528/29
[58] Field of Search .................... 524/755, 862, 524/375, 588; 556/445; 528/15, 31, 29

[56] References Cited

U.S. PATENT DOCUMENTS

| H1,265 | 12/1993 | Brady et al. | 514/665 |
| 3,280,160 | 10/1966 | Bailey | 260/448.2 |
| 3,518,288 | 6/1970 | Haluska | 260/448.2 |
| 4,933,002 | 6/1990 | Petroff et al. | 71/116 |
| 5,430,097 | 7/1995 | Petroff et al. | 524/755 |

Primary Examiner—Margaret W. Glass
Attorney, Agent, or Firm—Richard I. Gearhart

[57] ABSTRACT

An improved process is provided for the preparation of siloxane-oxyalkylene block copolymer surfactant compositions which utilize a hydrosilylation reaction with a phenyl ether as the reaction solvent and the use of a phenyl ether as a cold blend additive. Ethylene glycol phenyl ether is the preferred reaction solvent or cold blend additive.

8 Claims, No Drawings

PRODUCTION OF ORGANOPOLYSILOXANE COPOLYMERS WITH A PHENYL ETHER SOLVENT

This is a continuation-in-part of application Ser. No. 08/172,628, filed on Dec. 23, 1993, now U.S. Pat. No. 5,430,097.

FIELD OF THE INVENTION

This invention relates to a process for the preparation siloxane-oxyalkylene copolymers by the hydrosilylation reaction of an organohydrogensiloxane and an olefinically substituted polyoxyalkylene in a phenyl ether solvent. The invention also relates to using a phenyl ether as a cold blend additive for reducing the hazing and freezing point for a siloxane-oxyalkylene copolymer.

BACKGROUND OF THE INVENTION

The hydrosilylation reaction between the organohydrogenpolysiloxane and an olefinically substituted polyoxyalkylene reactant is typically performed in a low molecular weight volatile hydrocarbon solvent such as benzene, toluene, xylene or isopropanol to promote the solubility of the reactants, to aid in handling the reactants or to moderate an exothermic reaction. Less typically, the hydrosilylation reaction may be conducted without a solvent such as disclosed in U.S. Pat. No. 3,980,688 or conducted in an oxygen containing solvent such as a higher molecular weight alcohol.

For example, U.S. Pat. Nos. 3,280,160 and 3,401,192 disclose the preparation of copolymers in n-butylether and in a 50/50 mixture of isopropyl alcohol/toluene, respectively. In U.S. Pat. No. 4,122,029 the use of isopropyl alcohol is disclosed and in U.S. Pat. No. 3,518,288 the patentee teaches the use of n-propanol/toluene as a suitable solvent for the preparation of siloxane-oxyalkylene copolymers. The particular solvents employed in U.S. Pat. No. 4,857,583 are saturated polyols containing two or more hydroxyl groups. U.S. Pat. No. 4,857,583 states that if one were to use copolymers containing monohydric higher alcohols in urethane foam applications, these alcohols will enter into the urethane reaction and act as reaction chain terminators in a detrimental fashion because they contain only one hydroxyl group.

The reaction may also take place in a monocarboxylate ester of an alkanediol solvent as disclosed in U.S. Pat. No. 4,153,293 to Hales, et al. These solvents are advantageous because monocarboxylate ester solvents do not need to be stripped and recovered from the product. In addition, the monocarboxylate ester solvents are not hygroscopic, and therefore the problems associated with water contamination are alleviated. Of the above mentioned solvents, isopropyl alcohol (IPA) and toluene are the most common solvents used.

Silicone polyethers containing polyether groups greater than 10–12 EO units tend to form a hazy 2nd phase layer upon standing. This is generally believed to be due to unreacted allyl polyether which is added in excess to the reaction to facilitate complete consumption of the silicone hydride. The excess polyether (of EO chain length greater than EO 10–12) has a freeze point near or below room temperature. Thus, the excess freezes and causes the 2nd phase to form. This is problematic in numerous product applications such as personal care, where the appearance of the material is an indication of its' purity, as well as in industrial applications such as polyurethane foam making. In the manufacture of polyurethane foams, a 2nd phase which can settle to the bottom of a drum or tank can cause nonuniform feeds of surfactant into the foam making process. This causes variation in the performance of the surfactant.

In contrast to the teachings of the prior art, the present invention utilizes a phenyl ether solvent. The present inventors have discovered that phenyl ether solvents not only act as a solvent during hydrosilylation but improve the clarity and reduce the freeze point of the surfactant without a sacrifice of other properties. The phenyl ether solvents also do not need to be stripped and recovered from the product, saving an entire process step over earlier methods. Furthermore, the phenyl ether solvents are not flammable. The phenyl ether solvent can also be added as a cold blend additive to a silicone polyether made in a solvent other than a phenyl ether.

It is therefore an object of the present invention to provide an improved process for the preparation of siloxane-oxyalkylene copolymers.

Another object of this invention is to provide a process for the preparation of siloxane-oxyalkylene copolymers.

It is a further object of this invention to provide a process for the preparation of siloxane-oxyalkylene copolymers which are useful in the formulation of urethane foams and which contain a phenyl ether solvent.

It is also an object of this invention to teach a process to reduce the haze in a surfactant.

These and other objects will readily become apparent to those skilled in the art in the light of the teachings contained herein.

SUMMARY OF THE INVENTION

In it's preferred form, the present invention teaches the use of a phenyl ether, and in particular, ethylene glycol phenyl ether (EPh) as both a solvent in the hydrosilation process and as a means to improve the clarity of the resulting silicone polyether. The merits of introducing the EPh in the hydrosilylation process includes improved processing efficiency, and quality of the silicone polyether. By conducting the hydrosilylation directly in EPh, or another phenyl ether, the need to use a transient coupling solvent (toluene, IPA) is eliminated. This eliminates the need to subsequently strip off the solvent. Also, since the EPh will already be present in the formulation, it is not necessary to add it to suppress freeze point properties, which in turn eliminates the need for post blending. This reduces production expenses by eliminating the need for blend tanks. Eliminating the solvent strip will also reduce the heat history to which the product is exposed, reducing the discoloration of the silicone polyether.

These copolymers are prepared by the hydrosilylation reaction between an organohydrogenpolysiloxane and an olefinically substituted polyoxyalkylene, in the presence of a phenyl ether.

The process of the present invention comprises the steps of:

(I) forming a mixture of:

(A) an organosiloxane selected from the group consisting of organohydrogensiloxanes having the average structural formula:

in which formula

R is a hydrocarbon radical free of aliphatic unsaturation and contains from 1 to 10 carbon atoms, a has an average value from 1 to 226, and b has an average value from 1 to 30;

(B) a polyoxyalkylene selected from the group consisting of:

$$R^1(OCH_2CH_2)_z\text{—}OR^2 \quad (i)$$

$$R^1(OCH_2\overset{\underset{\displaystyle CH_3}{|}}{CH})_w\text{—}OR^2 \quad (ii)$$

$$R^1(OCH_2CH_2)_z(OCH_2\overset{\underset{\displaystyle CH_3}{|}}{CH})_w\text{—}OR^2 \quad (iii)$$

wherein the $(OCH_2CH_2)$ units and the $$(OCH_2\overset{\underset{\displaystyle CH_3}{|}}{CH})$$

units may be blocked or random, $R^1$ is an alkenyl group, $R^2$ is any substituent which does not interfere with the process, z has a value of from 1 to 40; and w has a value of 1 to 40;

(C) a phenyl ether of the general formula:

$$C_6H_5\text{—}O\text{—}Y$$

where Y is a monovalent hydrocarbon group; and (II) adding to said heated mixture, a catalytic amount of a noble metal hydrosilylation catalyst;

(III) maintaining the temperature of said mixture below 130° C.; and (IV) recovering said copolymer.

In the case where the phenyl ether is used as a cold blend additive, the siloxane-oxyalkylene copolymers will have at least one molecule of the formula:

$$R_3Si[OSi(CH_3)_2]_a[OSiQ(CH_3)]_bOSiR_3$$

in which formula

R is a hydrocarbon radical free of aliphatic unsaturation and contains from 1 to 10 carbon atoms, a has an average value from 1 to 226, and b has an average value from 1 to 30;

Q is a polyoxyalkylene selected from the group consisting of:

$$R^1(OCH_2CH_2)_z\text{—}OR^2 \quad (i)$$

$$R^1(OCH_2\overset{\underset{\displaystyle CH_3}{|}}{CH})_w\text{—}OR^2 \quad (ii)$$

$$R^1(OCH_2CH_2)_z(OCH_2\overset{\underset{\displaystyle CH_3}{|}}{CH})_w\text{—}OR^2 \quad (iii)$$

wherein the $(OCH_2CH_2)$ units and the $$(OCH_2\overset{\underset{\displaystyle CH_3}{|}}{CH})$$

units may be blocked or random, $R^1$ is an alkyl group, $R^2$ is hydrogen, $CH_3$, $$\overset{\underset{\displaystyle CCH_3}{||}}{\underset{\displaystyle }{O}}$$

or other non-reactive end-capping group, z has a value of from 1 to 40; and w has a value of 1 to 40.

The phenyl ether added as a cold blend additive will have the at least on molecule of general formula:

$$C_6H_5\text{—}O\text{—}Y$$

where Y is a monovalent hydrocarbon group.

DETAILED DESCRIPTION OF THE INVENTION

As indicated above, the present invention provides a process for the preparation of organosiloxane copolymers which are particularly useful in the preparation of rigid, high resiliency flexible and conventional flexible polyurethane foams. The process involves the hydrosilylation reaction of an organohydrogenpoly-siloxane and an olefinically substituted polyoxyalkylene in the presence of a phenyl ether.

The organohydrogensiloxane compounds employed in the present invention for the preparation of the copolymers are those having the average structural formula:

$$R_3Si[OSi(CH_3)_2]_a[OSiH(CH_3)]_bOSiR_3$$

in which formula

R is a hydrocarbon radical free of aliphatic unsaturation and contains from 1 to 10 carbon atoms, a has an average value from 1 to 226, and b has an average value from 1 to 30;

These organohydrogen siloxanes can be readily prepared by well known reactions and are commercially available.

The R group in the organohydrogensiloxane formula can be any hydrocarbon radical free of aliphatic unsaturation which contains from 1 to 10 carbon atoms. For example, R can be an alkyl, cycloalkyl, aryl, alkaryl, or an aralkyl radical. More specifically, R can be a methyl, ethyl, propyl, isopropyl, butyl, tertiary butyl, amyl, hexyl, heptyl, octyl, nonyl, decyl, cyclopentyl, cyclohexyl, phenyl, naphthyl, tolyl, xylyl, mesityl, t-butylphenyl, benzyl, 2-phenylethyl or a 2-phenylpropyl radical.

The olefinically substituted polyoxyalkylene reactant which can be employed in the process of this invention is selected from:

$$\text{—}R^1(OCH_2CH_2)_zOR^2 \quad (i)$$

$$\text{—}R^1(OCH_2\overset{\underset{\displaystyle CH_3}{|}}{CH})_w\text{—}OR^2, \quad (ii)$$

$$\text{—}R^1(OCH_2CH_2)_z(OCH_2\overset{\underset{\displaystyle CH_3}{|}}{CH})_w\text{—}OR^2 \quad (iii)$$

wherein $R^1$ denotes an alkylene group containing from 3 to 18 carbon atoms; $R^2$ is any substituent which does not interfere with the hydrosilylation reaction, z has a value of 1 to 40 and w has a value of 1 to 40. The ethylene oxide and propylene oxide units may be blocked or randomly distributed.

In the above polyoxyalkylene formula, $R^1$ contains from 3 to 18 carbon atoms. For example, $R^1$ can be ethylene, propylene, butylene, isobutylene, hexylene, octylene, dodecylene, octadecylene or a triacontylene radical. Examples of $R^2$ include hydroxy, alkoxy, acyloxy, aryloxy, alkylsilyl, acetyloxy, carbonate ester and isocyanate. Preferably, $R^2$ does not contain either an amine or mercaptan group.

In contrast to the prior art processes, the present invention utilizes a phenyl ether as the solvent in which the hydrosilylation reaction is conducted and which does not have to be removed from the reaction mixture, particularly when the copolymer reaction product is subsequently used in the preparation of urethane foams. As earlier indicated this saves an entire process step over prior processes, and the phenyl ether further acts as a freeze point suppressant in the resulting surfactant.

The solvent used in the invention is a phenyl ether which may generally be described by the following formula:

$$C_6H_5-O-Y$$

where Y is a monovalent hydrocarbon group such as an alkyl, cycloalkyl, aryl, alkaryl, an aralkyl radical, or glycol group. More specifically, Y can be a methanol, ethanol, propanol, glycol or phenyl group, a methyl, ethyl, propyl or butyl radical. Loadings of the solvent will be preferably about 20% of the solution by weight, but may be in the range of 10%–80%. An example of a preferred phenyl ether is ethylene glycol phenyl ether EPH from Dow Chemical Co., Inc., Midland, Mi., as same shows the best overall freeze point characteristics.

As previously indicated, the hydrosilylation reaction is conducted in the presence of a noble metal hydrosilylation catalyst. Thus, the hydrosilylation reaction between the organohydrogenpolysiloxane and the olefinically substituted polyoxyalkylene reactant is facilitated by using a catalytic amount of a noble metal containing catalyst. Such catalysts are well known and include platinum, palladium and rhodium-containing catalysts. The catalyst is employed in a catalytic amount sufficient to promote the hydrosilylation reaction. In practice the amount of catalyst will usually be within the range of from 1 to 30 ppm of noble metal based on the total parts of the mixture of reactants and solvent. Chloroplatinic acid ($H_2PtCl_6.H_2O$) is particularly preferred.

The hydrosilylation reaction, as previously noted, can be optionally conducted in the presence of a carboxylic acid salt. The preferred carboxylic acid salts contain 2 or more carbon atoms and are composed of carbon, hydrogen and oxygen. Particularly preferred are the monocarboxylic acid salts containing from 2 to 20 carbon atoms. Concentrations up to about 10,000 ppm can be employed and the actual amount will be dependent to some degree on the particular carboxylic acid salt employed.

In addition to using the phenyl ether solvent during the hydrosilation reaction, the inventors have also surprisingly found that a phenyl ether can be added as a cold blend additive to suppress the freezing point of a siloxane-oxyalkylene copolymer made by another process or using a different solvent.

The phenyl ether can be added to a neat siloxane-oxyalkylene copolymer (i.e. siloxane-oxyalkylene without solvent). The phenyl ether can also be added to a siloxane-oxyalkylene copolymer already in solvent, such as benzene, toluene, xylene, isopropanol, dipropylene glycol, or TEXANOL.

The amount of phenyl ether used as a cold blend additive will vary depending on the siloxane-oxyalkylene copolymer, and the type of phenyl ether used, and whether the siloxane-oxyalkylene copolymer is already dispersed in a another solvent. Typically the phenyl ether solvent will be added in an amount greater than 15% by weight of the composition, with a preferred range being between 20 and 50%, by weight of the composition and a most preferred range being from 20 to 35%, specifically 25–35%, by weight of the composition.

The siloxane-oxyalkylene copolymer can be prepared by any known method, including the hydrosilation method described above, or by condensation reaction. The siloxane-oxyalkylene copolymers will have at least one molecule of the formula:

$$R_3Si[OSi(CH_3)_2]_a[OSiQ(CH_3)]_bOSiR_3$$

in which formula

R is a hydrocarbon radical free of aliphatic unsaturation and contains from 1 to 10 carbon atoms, a has an average value from 1 to 226, and b has an average value from 1 to 30;

Q is a polyoxyalkylene selected from the group consisting of:

$$-R^1(OCH_2CH_2)_z-OR^2 \quad (i)$$

$$-R^1(OCH_2CH)_w-OR^2 \quad (ii)$$
$$\phantom{-R^1(OCH_2}|\phantom{H)_w-OR^2}$$
$$\phantom{-R^1(OCH_2}CH_3\phantom{_w-OR^2}$$

$$-R^1(OCH_2CH_2)_z(OCH_2CH)_w-OR^2 \quad (iii)$$
$$\phantom{-R^1(OCH_2CH_2)_z(OCH_2}|$$
$$\phantom{-R^1(OCH_2CH_2)_z(OCH_2}CH_3$$

wherein the $(OCH_2CH_2)$ units and the $$(OCH_2CH)$$
$$\phantom{(OCH_2}|$$
$$\phantom{(OCH_2}CH_3$$

units may be blocked or random, $R^1$ is an alkylene group, $R^2$ is hydrogen, $CH_3$, $$\overset{O}{\underset{\|}{C}}CH_3$$

or other non-reactive end-capping group, z has a value of from 1 to 40; and w has a value of 1 to 40.

The R group in the formula can be any hydrocarbon radical free of aliphatic unsaturation which contains from 1 to 10 carbon atoms. For example, R can be an alkyl, cycloalkyl, aryl, alkaryl, or an aralkyl radical. More specifically, R can be a methyl, ethyl, propyl, isopropyl, butyl, tertiary butyl, amyl, hexyl, heptyl, octyl, nonyl, decyl, cyclopentyl, cyclohexyl, phenyl, naphthyl, tolyl, xylyl, mesityl, t-butylphenyl, benzyl, 2-phenylethyl or a 2-phenylpropyl radical.

In the above formula for Q, $R^1$ contains from 3 to 18 carbon atoms. For example, $R^1$ can be ethylene, propylene, butylene, isobutylene, hexylene, octylene, dodecylene, octadecylene or a triacontylene radical. Examples of $R^2$ include hydroxy, alkoxy, acyloxy, aryloxy, alkylsilyl, acetyloxy, carbonate ester and isocyanate. Preferably, $R^2$ does not contain either an amine or mercaptan group.

It will be readily recognized by those skilled in the art that the siloxane-oxyalkylene copolymers of the present invention can also be blends of various siloxane-oxylalkylene copolymers described by the formula above, and the term "siloxane-oxylalkylene copolymers" as used herein is meant to include such blends.

The phenyl ether used as a cold blend additive will have at least one molecule of the general formula:

$$C_6H_5-O-Y$$

where Y is a monovalent hydrocarbon group. Such monovalent hydrocarbon groups include alkyl, cycloalkyl, aryl, alkaryl, an aralkyl radical, or glycol groups. More specifically, Y can be a methanol, ethanol, propanol, glycol or phenyl group, a methyl, ethyl, propyl or butyl radical. It will be readily recognized by those skilled in the art that the cold blend additives of the present invention can also be blends of various phenyl ethers described by the formula above, and the term "cold blend additive" as used herein is meant to include such blends. An example of a preferred phenyl ether is ethylene glycol phenyl ether (DOWANOL EPH from Dow Chemical Co., Inc., Midland, Mich.), as same shows the best overall freeze point characteristics.

The organopolysiloxane surfactants prepared by the process of the present invention are particularly useful and have been found to be excellent and efficient surfactants for the preparation of rigid, high resiliency flexible, and conventional flexible polyurethane foams. It has been found that the surfactants of this invention provide excellent levels of performance to polyurethane foams and avoid the necessity of solvent removal from the reaction mixture in which the organopolysiloxane was prepared. Since a relatively non-toxic solvent is used and its removal from the reaction mixture avoided, the surfactants are prepared under desirable environmental conditions.

In producing the polyurethane foams using the surfactant of this invention, one or more polyether polyols is employed for the reaction with the polyisocyanate reactant to provide the urethane linkage. Such polyether polyols have an average of at least two, and typically 2.0 to 3.5, hydroxyl groups per molecule and include compounds which consist of carbon, hydrogen and oxygen and compounds that may also contain phosphorous, halogen, and or nitrogen. Such polyether polyols are well known in the art and are commercially available.

The organic polyisocyanates that are useful in producing polyether polyurethane foams in accordance with the process of this invention are also well known in the art and are organic compounds that contain at least two isocyanate groups and any such compounds or mixtures thereof can be employed. The toluene diisocyanates are among many suitable isocyanates which are commercially used in the preparation of foams.

The urethane-foaming reaction is usually effected in the presence of a minor amount of a catalyst, preferably an amine catalyst and usually a tertiary amine. It is also preferred to include a minor amount of certain metal catalysts in addition to the amine catalyst in the component of the reaction mixture. Such supplementary catalysts are well known to those skilled in the art of polyether-based polyurethane foam manufacture. For example, useful metal catalysts include organic derivatives of tin, particularly tin compounds of carboxylic acids such as stannous octoate, stannous oleate and the like.

Foaming is accomplished by employing a small amount of a polyurethane blowing agent such as water in the reaction mixture, which upon reaction with isocyanate generates carbon dioxide in situ, or through the use of blowing agents which are vaporized by the exotherm of the reaction or by a combination of the two. These methods are well known in the art.

The polyether-based polyurethane foams of this invention may be formed in accordance with any of the processing techniques known in the art such as, in particular the "one-shot" technique, also known as the "one-step" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol and catalyst components.

It is understood that the relative amounts of the various components of the foam formulation are not narrowly critical. The polyether polyol and polyisocyanate are present in the foam-producing formulation in a major amount. The relative amounts of these two components in the amount required to produce the desired urethane structure of the foam and such relative amounts are well known in the art. The blowing agent, catalyst and surfactant are each present in a minor amount necessary to achieve the function of the component. Thus, the blowing agent is present in an amount sufficient to foam the reaction mixture, the catalyst is present in a catalytic amount which is the amount necessary to catalyze the reaction to produce the urethane at a reasonable rate, and the surfactant is present in an amount sufficient to impart the desired properties as indicated in Tables I–V.

The polyurethanes produced in accordance with the present invention can be used in the same areas as conventional flexible, high resiliency flexible and rigid polyether polyurethanes. For example, the foams of the present invention can be used with advantage in the manufacture of textile interliners, furniture, mattresses, laminates, linings, building insulation, flooring leveling, cushions, mattresses, padding, carpet underlay, packaging, gaskets, sealers, thermal insulators, upholstery, absorbent of crude oil spills on seawater, packaging and packing, marine flotation, auto components, cigarette filters, boat hulls, soundproofing, salvaging operations, shipbuilding (for buoyancy), transportation insulation for box cars, refrigerated cars, tank and hopper cars, trucks and trailers, insulation for storage tanks, ships' holds, pipelines, and the like.

EXAMPLES

In the following examples, Samples 1–7 are siloxane-oxyalkylene copolymers prepared for use as surfactants. Each sample was made using a different solvent. Otherwise, Samples 1–7 were prepared using identical procedure and reactants. The process for making the sufactants is described below.

Seven individual mixtures were prepared, each consisting of 31.88 g of $(CH_3)_3SiO((CH_3)_2SiO)_{226}(HSiCH_3O)_{30}OSi(CH_3)_3$ (17.71% by weight), 89.69 g of $CH_2=CHCH_3O(CH_2CH_2O)_{18}(CHCH_3CH_2O)_{18}COCH_3$ (49.83% by weight), and 22.43 g of $CH_2=CHCH_3O(CH_2CH_2O)_{12}COCH_3$ (12.46% by weight). Each mixture was loaded into a separate 1 liter 3 neck flask having an air powered stir motor, 10 bulb condenser, and thermowell with sidearm hose adaptor. After mixing, 36 g of a solvent was added to each mixture, the solvent comprising 20% by weight of each mixture. Table #1 below describes the type of solvent added.

TABLE #1

| Types of Ether Added as Solvent | |
|---|---|
| Sample | Solvent |
| 1. | Ethylene Glycol Phenyl Ether |
| 2. | Propylene Glycol Phenyl Ether |

TABLE #1-continued

| Types of Ether Added as Solvent | |
|---|---|
| Sample | Solvent |
| 3. | Dipropylene Glycol Methyl Ether |
| 4. | Propylene Glycol n-Butyl Ether |
| 5. | Propylene Glycol Methyl Ether Acetate |
| 6. | Diphenyl Ether |
| 7. | Ethyl Phenyl Ether |

The solvents were mixed in the flasks, then nitrogen fed into each flask through the side arm adapter. The mixtures were heated to 75 dC. A catalyst, consisting of a 0.69% (as Pt) solution of chloroplatonic acid in isopropyl alcohol was added and the temperatures of the mixtures were heated to 95dC. The fluids were mixed at 95dC for 90 minutes. At that time, the residual SiH was measured by Fourier Transformer IR, said technique being well know in the art. If the residual SiH was found to be zero, then the fluid was cooled and collected. If the residual SiH was not zero, then the fluid was allowed to react until it reached zero, then cooled and collected, or the reaction was stopped before the residual SiH equaled zero, and the fluid was cooled and collected. These surfactants were used in the experiments conducted below.

EXAMPLE I

Table #2 summarizes the physical properties and hydrosilylation reaction profiles for the seven reactions. The amount of residual SiH was measured to determine compatibility of the reactants of the initial mixture and the relative usefullness of the solvents. If the solvent promotes good conduct between the reatants, then short batch times will result, and residual SiH will be low after the reaction is completed.

TABLE #2

| | Hydrosilylation & Physical Properties | | |
|---|---|---|---|
| Sample No. Solvent | Batch Time (min) | Residual SiH (ppm) | Viscosity (cst) |
| 1. Ethylene Glycol Phenyl Ether | 90 | 0 | 2309 |
| 2. Propylene Glycol Phenyl Ether | 90 | 0 | 1995 |
| 3. Dipropylene Glycol Methyl Ether | 90 | 0 | 782 |
| 4. Propylene Glycol n-Butyl Ether | 90 | 0 | 745 |
| 5. Propylene Glycol Methyl Ether Acetate | 90 | 80 | 536 |
| 6. Diphenyl Ether | 370 | 7 | 1183 |
| 7. Ethyl Phenyl Ether | 270 | 12 | 721 |

Sample 5 did not consume all the SiH within the 90 minute batch time, as indicated by the residual SiH level of 80. This calculated to only 80% of the available of SiH sites being consumed. The reaction was not carried further and the product of Sample 5 was collected with this level of residual SiH. The longer batch time illustrated in the table above is assumed to be the result of the poorer compatibilizing ability of propylene glycol methyl ether acetate.

The two non-glycol phenyl ethers, Samples 6 and 7, also exhibited long batch times. The reactions were allowed to go to completion and the time required to consume all the SiH monitored. The reaction utilizing diphenyl ether (Sample 6) resulted in a fluid with 7 ppm residual SiH. A batch time of 370 minutes was required to achieve this level of completion. The reaction utilizing ethyl phenyl ether (Sample 7) resulted in a residual SiH level of 12 ppm. A batch time of 270 minutes was required. Both residual SiH levels are well within acceptable levels for reaction completion.

EXAMPLE II

Samples 1 through 7 of each reaction mixture were then placed in sealed 1 oz. vials and stored in a 9° C. refrigerator. The appearance of the samples was monitored as a function of time. Table #3 summarizes this data.

TABLE #3

| | | Appearance vs. Time at 9° C. | | | | | | |
|---|---|---|---|---|---|---|---|---|
| | | Appearance (after x days in refrigerator) | | | | | | |
| Sample # | Solvent | 0 | 1 | 5 | 12 | 19 | 21 | 35 |
| 1. | Ethylene Glycol Phenyl Ether | 0 | 0 | 0 | 0 | 0 | 0 | 0 |
| 2. | Propylene Glycol Phenyl Ether | 0 | 0 | 0 | 0 | 0 | 0 | 0 |
| 3. | Dipropylene Glycol Methyl Ether | 0 | 1 | 2 | 3 | — | — | 3 |
| 4. | Propylene Glycol n-Butyl Ether | 0 | 0 | 2 | 3 | — | — | 3 |
| 5. | Propylene Glycol Methyl Ether Acetate | 0 | 0 | 0 | 2 | — | — | 3 |
| 6. | Diphenyl Ether | 1 | 1 | 1 | — | 1 | 1 | — |
| 7. | Ethyl Phenyl Ether | 0 | 1 | 1 | — | 1 | 2 | — |

Key
0 = clear, amber fluid; 1 = slight, uniformly hazy fluid; 2 = flocculent present in fluid; 3 = 2nd layer settled out on bottom of vial; 5 = frozen.

Table #3 shows that the materials prepared with the class of phenyl ethers remains constant in appearance over the course of time. Samples 1 and 2, which were prepared in ethylene glycol phenyl ether and propylene glycol phenyl ether remained clear, amber fluids over the course of the experiment. The sample prepared in diphenyl ether (Sample 6) had an initial uniform hazy appearance. It did not change in appearance over the course of the experiment. The sample prepared in ethyl phenyl either (Sample 7) was clear and amber initially. It began to flocculate after three weeks at 9° C., but nothing had settled to the bottom of the vial.

The samples prepared with the other solvents all changed dramatically over the course of the experiment. Samples 3, 4 and 5 which were prepared with dipropylene glycol methyl ether, propylene glycol n-butyl ether, and propylene glycol methyl ether acetate, all were initially clear, amber fluids. Upon storage in the 9° C. refrigerator they all went through phases where they hazed, flocculated, and eventually a layer separated on the bottom of the vial. These were in stark contrast to the clear, uniform one phase appearance of Samples 1 and 2.

EXAMPLE III

Sample 1 was evaluated in a polyurethane foam formulation to determine its ability to stabilize the flexible foam produced. A sample of surfactant was added to urethane raw materials as described earlier, then mixed, then allowed to free rise. One measure of performance of the surfactant is determined by measuring the height to which the foam rises and cures. The results are shown in Table #4.

TABLE #4

Foam Performance of Sample 1 v. Control

| Sample ID | FRH | FCH | Density | Surf Wt | T-10 |
|---|---|---|---|---|---|
| Control | | | | | |
| Trial 1 | 656.8 | 635.7 | 1.17/1.01 | 2.5 | .75 |
| Trial 2 | 656.0 | 636.1 | 1.19/1.02 | 2.5 | .75 |
| Trial 3 | 657.4 | 637.0 | 1.21/1.04 | 2.5 | .75 |
| Sample 1 | | | | | |
| Trial 1 | 656.5 | 637.7 | 1.17/1.03 | 2.5 | .75 |
| Trial 2 | 657.4 | 636.4 | 1.14/0.99 | 2.5 | .75 |
| Trial 3 | 657.8 | 636.3 | 1.19/1.00 | 2.5 | .75 |

The surfactant used as the control did not contain a phenyl ether as a solvent or additive, but instead was produced using a conventional solvent, namely, isopropanol. The values measured were the free rise height (FRH), which measures the highest point to which the foam rises, the free cured height (FCH), which is the height of the foam when cured, the oven time, which is the time it takes the foam to cure in an oven of 200 degrees F, and the density of the cured foam. In addition, the table shows the amount of tin caltaylst added to the mixture, (T- 10) and the amount of surfactant by weight added to the foam.

The performance of the foam containing the phenyl ether solvent of Sample 1 shows results virtually identical to the results using the standard control solvent. The free rise heights in each trial and the free cured heights were virtually identical. Moreover, the density of the control surfactant and the phenyl ether surfactant were similar. In conclusion, the phenyl ether surfactant performed well compared to the control as a foaming additive.

EXAMPLE IV

Table #5 details a study examining the appearance of Sample 1 relative to a series of silicone polyethers produced using existing technologies. Individual samples of each material were stored in the lab, or outside under ambient winter conditions (generally under 30° F.). The samples include were prepared as follows:

Sample A was prepared in the same manner as Samples 1–7 described above except that TEXANOL was used as the solvent, comprising 20% by weight of the total reaction mixture. TEXANOL is an ether alcohol, available from Eastman Chemical, Kingsport, Tenn. Sample A represents the same current, standard industrial solvent as the control group described in Example IV above.

Sample B was prepared in the same manner as Samples 1–7 described above except that TEXANOL was used as the solvent, comprising 30% by weight of the total reaction mixture. Sample B was included to ascertain if simply increasing the level of TEXANOL would improve the clarity of the mixture.

Sample C was prepared in the same manner as Sample A described above except that $CH_2=CHCH_3O(CH_2CH_2O)_{18}(CHCH_3CH_2O)_{18}COCH_3$ was the s preparation of the silicone polyether. The $CH_2=CHCH_3O(CH_2CH_2O)_{12}H$, which was suspected of causing the 2nd phase was omitted from the mixture. TEXANOL was used as the solvent, comprising 20% by weight of the total reaction mixture.

Sample D was equivalent to Sample 1 earlier described.

TABLE #5

APPEARANCE VS. TIME

| Material | 1/15/93 | 1/18/93 | 1/19/93 | 1/25/93 | 1/28/93 | 2/10/93 | 2/16/93 |
|---|---|---|---|---|---|---|---|
| Inside Samples (temp. –68° F.)[1] | | | | | | | |
| Sample A | — | — | 1 | 2 | 2 | 3 | 3 |
| Sample B | — | 3 | 3 | 3 | 3 | 3 | 3 |
| Sample C | 0 | 1 | 1 | 1 | 0 | 1 | 0 |
| Sample D | 0 | 0 | 0 | 0 | 0 | 0 | 0 |
| Outside Samples (temp 6° F.–37° F.) | | | | | | | |
| Sample A | 5 | 5 | 5 | 5 | 5 | 5 | 5 |
| Sample B | — | 3 | 3 | 3 | 3 | 3 | 3 |
| Sample C | 0 | 1 | 1 | 1 | 0 | 0 | 1 |
| Sample D | 0 | 1 | 1 | 1 | 0 | 0 | 1 |

[1]Test initiated 1/14/93
Key
0 = clear, amber fluid; 1 = slight, uniformly hazy fluid; 2 = flocculent present in fluid; 3 = 2nd layer settled out on bottom of vial; 5 = frozen.

Table #4 shows that Sample A produced in TEXANOL not only forms a second phase layer, but upon standing in ambient winter conditions freezes and becomes nonpourable. This clearly would not be an acceptable product for industrial use. Sample B (30% TEXANOL) formed a second phase as well indicating that adding more TEXANOL will not resolve a clarity issue at least below the 30% level. Sample C prepared without $CH_2=CHCH_3O(CH_2CH_2O)_{12}H$ yielded a material which remained clear and pourable, showing the impact of the $CH_2=CHCH_3O(CH_2CH_2O)_{12}H$ on the formation of a 2nd phase. Sample D remained clear and pourable throughout the study. Vary slight haze was detected in Sample D stored outside. No evidence of any separation was detected in Sample D kept in the lab.

EXAMPLE V

Ethylene glycol phenyl ether ("EGPE"), dipropylene glycol methyl ether ("DGME"), propylene glycol phenyl ether ("PGPE"), and tetraethylene glycol ("TG") were tested as cold blend additives. Each was added in the amounts shown below to a composition of DOW CORNING DC 5357, a siloxane-oxyalkylene copolymer. The siloxane-oxyalkylene copolymer was made via a hydrosilylation process using isopropanol (IPA) as the coupling solvent. The IPA was stripped off the siloxane-oxyalkylene copolymer prior to the addition of the cold blend additive.

The samples were placed in a refrigerator, and the following scale was used to describe them over the period of time the samples were refrigerated: 1=clear amber; 2=slight haze (with some turbidity); 3=flocculent suspended; 4=2nd phase settled on bottom of vial; 5=frozen solid. The refrigerator was kept at 10° C. until Day 14, when it was lowered to 0° C. All samples were initially clear amber (scale=1).

TABLE #6

| Days in refrigerator | ½ | 1 | 2 | 4 | 8 | 9 | 11 | 14 | 15 | 16 |
|---|---|---|---|---|---|---|---|---|---|---|
| Ref Control (0%) | 5 | 5 | 5 | 5 | 5 | 5 | 5 | 5 | 5 | 5 |
| EGPE 10% | 1 | 5 | 5 | 5 | 5 | 5 | 5 | 5 | 5 | 5 |
| EGPE 20% | 1 | 1 | 1 | 1 | 1 | 1 | 1 | 1 | 1 | 5 |
| EGPE 30% | 1 | 1 | 1 | 1 | 1 | 1 | 1 | 1 | 1 | 1 |
| PGPE 10% | 1 | 5 | 5 | 5 | 5 | 5 | 5 | 5 | 5 | 5 |
| PGPE 20% | 1 | 1 | 1 | 1 | 1 | 1 | 1 | 1 | 1 | 5 |
| PGPE 30% | 1 | 1 | 1 | 1 | 1 | 1 | 1 | 1 | 1 | 1 |
| DGME 10% | 1 | 5 | 5 | 5 | 5 | 5 | 5 | 5 | 5 | 5 |
| DGME 20% | 1 | 5 | 5 | 5 | 5 | 5 | 5 | 5 | 5 | 5 |
| DGME 30% | 1 | 1 | 1 | 1 | 1 | 1 | 1 | 2 | 5 | 5 |
| TG 10% | 1 | 5 | 5 | 5 | 5 | 5 | 5 | 5 | 5 | 5 |
| TG 20% | 1 | 5 | 5 | 5 | 5 | 5 | 5 | 5 | 5 | 5 |
| TG 30% | 1 | 1 | 1 | 1 | 1 | 1 | 1 | 2 | 5 | 5 |

The phenyl ether cold blend additives, ethylene glycol phenyl ether ("EGPE") and propylene glycol phenyl ether ("PGPE"), showed substantially improved clarity over the other additives dipropylene glycol methyl ether ("DGME") and tetraethylene glycol ("TG") over the test period at levels of 20% or greater. The phenyl ether additives also showed superior results when the temperature was dropped on Day 14, to 0° C., where the phenyl ether additives still did not freeze at levels of 30%.

What is claimed is:

1. A composition comprising:
   (A) at least one siloxane-oxyalkylene copolymer of the formula:

$R_3Si[OSi(CH_3)_2]_a[OSiQ(CH_3)]_bOSiR_3$ in which formula
   R is a hydrocarbon radical free of aliphatic unsaturation and contains from 1 to 10 carbon atoms,
   a has an average value from 1 to 226, and
   b has an average value from 1 to 30;
   Q is a polyoxyalkylene selected from the group consisting of:

$=R^1(OCH_2CH_2)_z-OR^2$ (i)

and $=R^1(OCH_2CH)_w-OR^2$ with $CH_3$ branch (ii)

$=R^1(OCH_2CH_2)_z(OCH_2CH)_w-OR^2$ with $CH_3$ branch (iii)

wherein the $(OCH_2CH_2)$ units and the $(OCH_2CH)$ with $CH_3$ branch units are blocked or random,
   $R^1$ is an alkyl group,
   $R^2$ is hydrogen, $CH_3$, $\overset{O}{\underset{\|}{C}}CH_3$ or other non-reactive end-capping group,
   z has a value of from 1 to 40, and
   w has a value of 1 to 40; and
   (B) at least one phenyl ether, comprising greater than 15% of the composition by weight, having the general formula:

$C_6H_5-O-Y$ where Y is a monovalent hydrocarbon group.

2. The composition of claim 1 wherein the phenyl ether is ethylene glycol phenyl ether or propylene glycol phenyl ether.

3. The composition of claim 1 wherein the phenyl ether is present in an amount of from 20 to 50 weight percent of the total composition.

4. The composition of claim 1, wherein the phenyl ether is present in an amount from 25 to 35 weight percent of the total composition.

5. A method of reducing the freezing point of a siloxane-oxyalkylene copolymer, comprising the steps of:
   (I) preparing at least one siloxane-oxyalkylene copolymer of the formula $R_3Si[OSi(CH_3)_2]_a[OSiQ(CH_3)]_bOSiR_3$ in which formula
   R is a hydrocarbon radical free of aliphatic unsaturation and contains from 1 to 10 carbon atoms,
   a has an average value from 1 to 226, and
   b has an average value from 1 to 30;
   Q is a polyoxyalkylene selected from the group consisting of:

$=R^1(OCH_2CH_2)_z-OR^2$ (i)

$=R^1(OCH_2CH)_w-OR^2$ with $CH_3$ branch (ii)

$=R^1(OCH_2CH_2)_z(OCH_2CH)_w-OR^2$ with $CH_3$ branch (iii)

wherein the (OCH$_2$CH$_2$) units and the $$\underset{\displaystyle (OCH_2CH)}{\overset{\displaystyle CH_3}{|}}$$

units are blocked or random,

R is an alkyl group,

R$^2$ is hydrogen, CH$_3$, $$\underset{\displaystyle CCH_3}{\overset{\displaystyle O}{\|}}$$

or other non-reactive end-capping group, z has a value of from 1 to 40, and w has a value of 1 to 40; and (II) adding to the siloxane-oxyalkylene copolymer at least one phenyl ether, comprising greater than 15% of the composition by weight, having the general formula:

$$C_6H_5—O—Y$$

where Y is a monovalent hydrocarbon group.

6. The composition of claim 5 wherein the phenyl ether is ethylene glycol phenyl ether or propylene glycol phenyl ether.

7. The composition of claim 5 wherein the phenyl ether is present in an amount of from 20 to 50 weight percent of the total composition.

8. The composition of claim 5, wherein the phenyl ether is present in an amount from 25 to 35 weight percent of the total composition.

* * * * *